United States Patent [19]
Smith et al.

[11] Patent Number: 6,024,220
[45] Date of Patent: Feb. 15, 2000

[54] ENCAPSULATED SEAM FOR MULTILAYER MATERIALS

[75] Inventors: Sidney T. Smith, Lake Forest, Ill.;
Bradley Buchanan, Ross, Calif.;
Steven Giovanetto, Vernon Hills;
Larry Rosenbaum, Gurnee, both of Ill.

[73] Assignee: Baxter International Inc., Deerfield, Ill.

[21] Appl. No.: 08/998,256

[22] Filed: Dec. 24, 1997

Related U.S. Application Data

[63] Continuation-in-part of application No. 08/478,869, Jun. 7, 1995, abandoned.

[51] Int. Cl.$^7$ .................................................. B65D 35/10
[52] U.S. Cl. ...................... 206/484; 206/219; 383/107; 383/109; 493/211; 604/408; 604/410
[58] Field of Search ................. 206/484, 484.1, 206/484.2, 219, 220, 806; 383/107, 109; 604/408, 410, 416; 493/210, 211, 220

[56] References Cited

U.S. PATENT DOCUMENTS

| | | |
|---|---|---|
| D. 285,725 | 9/1986 | Franchere . |
| 2,350,132 | 5/1944 | Rohdin .................................... 383/107 |
| 2,406,660 | 8/1946 | Brady . |
| 2,584,633 | 2/1952 | Southwick, Jr. ..................... 206/484.2 |
| 2,705,223 | 3/1955 | Renfrew et al. . |

(List continued on next page.)

FOREIGN PATENT DOCUMENTS

| | | |
|---|---|---|
| 092897 | 2/1983 | European Pat. Off. . |
| 148161 | 1/1985 | European Pat. Off. . |
| 310143 | 7/1985 | European Pat. Off. . |
| 340305 | 1/1988 | European Pat. Off. . |
| 446505 | 3/1990 | European Pat. Off. . |
| 0 194 684 B1 | 3/1991 | European Pat. Off. . |
| 488544 | 11/1991 | European Pat. Off. . |
| 552412 | 9/1992 | European Pat. Off. . |
| 2688511 | 3/1992 | France . |
| 2800437 | 7/1978 | Germany . |

(List continued on next page.)

OTHER PUBLICATIONS

Polymer Handbook, 3$^{rd}$. Ed., J. Brandrup and E.H. Immergut, John Wiley & Sons.
Encyclopedia of Polymer Science and Engineering, vol. 16, Styrene, Polymers to Toys, John Wiley & Sons.
Toughened Plastics, C.B. Bucknall, Applied Science Publishers, Ltd.
Polymer Blends, vol. 1, Seymour Newman, Academic Press.
Thermoplastics for Health–Care Products: Clear Choices Are Not So Clear, K.Z. Hong, Ph.D., Baxter Healthcare Corporation.
Plastics Engineering, Oct. 1995, Official Publication of The Society of Plastics Engineers.

*Primary Examiner*—Paul T. Sewell
*Assistant Examiner*—Luan K. Bui
*Attorney, Agent, or Firm*—Mark J. Buonaiuto; Joseph A. Fuchs

[57] ABSTRACT

A container is disclosed comprising a first sidewall having a first layer and a second layer. The second layer overlaps a portion of the first layer to define an overlap area. A sealing flange extends from the first layer outward of the overlap area. A second sidewall is connected to the first sidewall along the sealing flange to define an inner chamber therebetween. The second sidewall and the sealing flange define a first layered structure having a first number of layers along the sealing flange. The overlap area and the second sidewall define a second layered structure having a second number of layers. The second number of layers is greater than the first number of layers. The container is sealed by positioning peripheral edges of the first and second sidewalls into registration so that the overlap area is substantially centrally disposed over the second sidewall and applying sealing energy to the first number of layers to define a peripheral seam.

22 Claims, 6 Drawing Sheets

U.S. PATENT DOCUMENTS

| | | |
|---|---|---|
| 3,255,923 | 6/1966 | Soto . |
| 3,375,300 | 3/1968 | Ropp . |
| 3,390,469 | 7/1968 | Rader . |
| 3,403,064 | 9/1968 | Bellamy . |
| 3,419,654 | 12/1968 | Chiba et al. . |
| 3,485,782 | 12/1969 | Nagle et al. . |
| 3,768,724 | 10/1973 | Hill ........................................ 383/107 |
| 3,772,136 | 11/1973 | Workman . |
| 3,885,081 | 5/1975 | Van Paesschen et al. . |
| 3,912,843 | 10/1975 | Brazier . |
| 3,937,758 | 2/1976 | Castagna . |
| 3,956,045 | 5/1976 | Hoffman ................................ 383/107 |
| 3,960,997 | 6/1976 | Sorensen . |
| 3,995,084 | 11/1976 | Berger et al. . |
| 4,005,710 | 2/1977 | Zeddies et al. . |
| 4,011,798 | 3/1977 | Bambara et al. ....................... 383/107 |
| 4,041,103 | 8/1977 | Davison et al. . |
| 4,045,515 | 8/1977 | Isaka et al. . |
| 4,058,647 | 11/1977 | Inoue et al. . |
| 4,085,244 | 4/1978 | Stillman . |
| 4,087,002 | 5/1978 | Bambara et al. ....................... 383/107 |
| 4,087,587 | 5/1978 | Shida et al. . |
| 4,087,588 | 5/1978 | Shida et al. . |
| 4,095,012 | 6/1978 | Schirmer . |
| 4,103,686 | 8/1978 | LeFevre et al. . |
| 4,112,989 | 9/1978 | Grode et al. . |
| 4,140,162 | 2/1979 | Gajewski et al. . |
| 4,147,827 | 4/1979 | Breidt, Jr. et al. . |
| 4,156,709 | 5/1979 | Kondo et al. . |
| 4,161,362 | 7/1979 | Blake . |
| 4,188,350 | 2/1980 | Vicik et al. . |
| 4,226,822 | 10/1980 | Yoshikawa et al. . |
| 4,227,527 | 10/1980 | De Frank et al. . |
| 4,230,830 | 10/1980 | Tanny et al. . |
| 4,233,367 | 11/1980 | Ticknor et al. . |
| 4,244,378 | 1/1981 | Brignola . |
| 4,261,473 | 4/1981 | Yamada et al. . |
| 4,274,900 | 6/1981 | Mueller et al. . |
| 4,286,628 | 9/1981 | Paradis et al. . |
| 4,294,935 | 10/1981 | Kodera et al. . |
| 4,310,017 | 1/1982 | Raines . |
| 4,311,807 | 1/1982 | McCullough, Jr. et al. . |
| 4,322,465 | 3/1982 | Webster . |
| 4,322,480 | 3/1982 | Tuller et al. . |
| 4,327,726 | 5/1982 | Kwong et al. . |
| 4,332,655 | 6/1982 | Berejka . |
| 4,333,968 | 6/1982 | Nahmias . |
| 4,362,844 | 12/1982 | Lemstra et al. . |
| 4,369,812 | 1/1983 | Paradis et al. . |
| 4,387,184 | 6/1983 | Coquard et al. . |
| 4,405,667 | 9/1983 | Christensen et al. . |
| 4,407,877 | 10/1983 | Rasmussen . |
| 4,407,888 | 10/1983 | Crofts . |
| 4,417,753 | 11/1983 | Bacehowski et al. . |
| 4,421,235 | 12/1983 | Moriya . |
| 4,429,076 | 1/1984 | Saito et al. . |
| 4,478,858 | 10/1984 | Baird et al. . |
| 4,479,989 | 10/1984 | Mahal . |
| 4,497,857 | 2/1985 | Bonis ..................................... 383/107 |
| 4,514,499 | 4/1985 | Noll . |
| 4,521,437 | 6/1985 | Storms . |
| 4,540,537 | 9/1985 | Kamp . |
| 4,546,085 | 10/1985 | Johansson et al. . |
| 4,548,348 | 10/1985 | Clements . |
| 4,562,118 | 12/1985 | Maruhashi et al. . |
| 4,568,333 | 2/1986 | Sawyer et al. . |
| 4,568,723 | 2/1986 | Lu . |
| 4,572,854 | 2/1986 | Dallmann et al. . |
| 4,588,648 | 5/1986 | Krueger et al. . |
| 4,599,276 | 7/1986 | Martini . |
| 4,614,781 | 9/1986 | Hori et al. . |
| 4,621,014 | 11/1986 | Lu . |
| 4,627,844 | 12/1986 | Schmitt . |
| 4,636,412 | 1/1987 | Field . |
| 4,640,870 | 2/1987 | Akazawa et al. . |
| 4,643,926 | 2/1987 | Mueller . |
| 4,654,240 | 3/1987 | Johnston . |
| 4,678,713 | 7/1987 | Lancaster et al. . |
| 4,680,208 | 7/1987 | Aoki et al. . |
| 4,683,916 | 8/1987 | Raines . |
| 4,684,364 | 8/1987 | Sawyer et al. . |
| 4,686,125 | 8/1987 | Johnston et al. . |
| 4,690,915 | 9/1987 | Rosenberg . |
| 4,692,361 | 9/1987 | Johnston et al. . |
| 4,705,708 | 11/1987 | Briggs et al. . |
| 4,707,389 | 11/1987 | Ward . |
| 4,722,725 | 2/1988 | Sawyer et al. . |
| 4,724,028 | 2/1988 | Zabielski et al. . |
| 4,724,961 | 2/1988 | Shimoyamada et al. . |
| 4,726,997 | 2/1988 | Mueller et al. . |
| 4,732,795 | 3/1988 | Ohya et al. . |
| 4,734,327 | 3/1988 | Vicik . |
| 4,735,855 | 4/1988 | Wofford et al. . |
| 4,740,582 | 4/1988 | Coquard et al. . |
| 4,753,222 | 6/1988 | Morishita . |
| 4,760,114 | 7/1988 | Haaf et al. . |
| 4,764,404 | 8/1988 | Genske et al. . |
| 4,767,651 | 8/1988 | Starczewski et al. . |
| 4,770,856 | 9/1988 | Uthemann et al. . |
| 4,772,497 | 9/1988 | Maasola . |
| 4,778,697 | 10/1988 | Genske et al. . |
| 4,792,488 | 12/1988 | Schirmer . |
| 4,795,782 | 1/1989 | Lutz et al. . |
| 4,800,129 | 1/1989 | Deak . |
| 4,801,484 | 1/1989 | Yao et al. . |
| 4,803,102 | 2/1989 | Rainere et al. . |
| 4,824,720 | 4/1989 | Malone . |
| 4,829,002 | 5/1989 | Pattillo et al. . |
| 4,834,755 | 5/1989 | Silverstrini et al. . |
| 4,839,292 | 6/1989 | Cremonese . |
| 4,855,356 | 8/1989 | Holub et al. . |
| 4,856,259 | 8/1989 | Woo et al. . |
| 4,856,260 | 8/1989 | Woo et al. . |
| 4,863,996 | 9/1989 | Nakazima et al. . |
| 4,871,799 | 10/1989 | Kobayashi et al. . |
| 4,873,287 | 10/1989 | Holub et al. . |
| 4,877,682 | 10/1989 | Sauers et al. . |
| 4,885,119 | 12/1989 | Mueller et al. . |
| 4,910,085 | 3/1990 | Raniere et al. . |
| 4,910,147 | 3/1990 | Bacheowski et al. . |
| 4,915,893 | 4/1990 | Gogolewski et al. . |
| 4,923,470 | 5/1990 | Dumican . |
| 4,929,479 | 5/1990 | Shishido et al. . |
| 4,937,194 | 6/1990 | Pattillo et al. . |
| 4,939,151 | 7/1990 | Bacehowski et al. . |
| 4,948,643 | 8/1990 | Mueller . |
| 4,957,966 | 9/1990 | Nishio et al. . |
| 4,957,967 | 9/1990 | Mizuno et al. . |
| 4,966,795 | 10/1990 | Genske et al. . |
| 4,977,213 | 12/1990 | Giroud-Abel et al. . |
| 4,978,579 | 12/1990 | Rosenbaum . |
| 4,994,056 | 2/1991 | Ikeda . |
| 4,996,054 | 2/1991 | Pietsch et al. . |
| 4,999,254 | 3/1991 | Ofstein . |
| 4,999,297 | 3/1991 | Minoura et al. . |
| 5,006,114 | 4/1991 | Rogers et al. . |
| 5,006,601 | 4/1991 | Lutz et al. . |
| 5,017,490 | 5/1991 | Taiariol et al. . |
| 5,017,652 | 5/1991 | Abe et al. . |
| 5,034,457 | 7/1991 | Serini et al. . |
| 5,034,458 | 7/1991 | Serini et al. . |
| 5,053,457 | 10/1991 | Lee . |

| | | |
|---|---|---|
| 5,062,569 | 11/1991 | Hekal . |
| 5,066,290 | 11/1991 | Measells et al. . |
| 5,071,686 | 12/1991 | Genske et al. . |
| 5,071,911 | 12/1991 | Furuta et al. . |
| 5,071,912 | 12/1991 | Furuta et al. . |
| 5,075,376 | 12/1991 | Furuta et al. . |
| 5,079,295 | 1/1992 | Furuta et al. . |
| 5,085,649 | 2/1992 | Flynn . |
| 5,093,164 | 3/1992 | Bauer et al. . |
| 5,093,194 | 3/1992 | Touhsaent et al. . |
| 5,094,921 | 3/1992 | Itamura et al. . |
| 5,098,202 | 3/1992 | Rosenbaum . |
| 5,108,844 | 4/1992 | Blemberg et al. . |
| 5,110,642 | 5/1992 | Genske . |
| 5,116,906 | 5/1992 | Mitzuno et al. . |
| 5,126,132 | 6/1992 | Rosenberg . |
| 5,127,904 | 7/1992 | Loo et al. . |
| 5,129,894 | 7/1992 | Sommermeyer et al. . |
| 5,132,363 | 7/1992 | Furuta et al. . |
| 5,135,785 | 8/1992 | Millon . |
| 5,139,831 | 8/1992 | Mueller . |
| 5,139,946 | 8/1992 | Howell et al. . |
| 5,145,731 | 9/1992 | Lund et al. . |
| 5,154,979 | 10/1992 | Kerschbaumer et al. . |
| 5,158,499 | 10/1992 | Guckenberger . |
| 5,159,004 | 10/1992 | Furuta et al. . |
| 5,164,267 | 11/1992 | D'Heur et al. . |
| 5,164,268 | 11/1992 | Dollinger et al. . |
| 5,176,634 | 1/1993 | Smith et al. . |
| 5,176,956 | 1/1993 | Jevne et al. . |
| 5,183,706 | 2/1993 | Bekele . |
| 5,185,189 | 2/1993 | Stenger et al. . |
| 5,189,091 | 2/1993 | Laughner . |
| 5,194,316 | 3/1993 | Horner et al. . |
| 5,196,254 | 3/1993 | Akiyama . |
| 5,206,290 | 4/1993 | Mizuno et al. . |
| 5,212,238 | 5/1993 | Scheibelhoffer et al. . |
| 5,218,048 | 6/1993 | Abe et al. . |
| 5,225,346 | 7/1993 | Matsumiya et al. . |
| 5,226,564 | 7/1993 | Steer et al. ............................ 383/107 |
| 5,230,934 | 7/1993 | Sakano et al. . |
| 5,230,935 | 7/1993 | Delimoy et al. . |
| 5,238,997 | 8/1993 | Bauer et al. . |
| 5,244,971 | 9/1993 | Jean-Marc . |
| 5,258,230 | 11/1993 | LaFleur et al. . |
| 5,272,084 | 12/1993 | O'Connell et al. . |
| 5,278,231 | 1/1994 | Chundury . |
| 5,287,961 | 2/1994 | Herran . |
| 5,288,531 | 2/1994 | Falla et al. . |
| 5,288,799 | 2/1994 | Schmid et al. . |
| 5,290,856 | 3/1994 | Okamoto et al. . |
| 5,306,542 | 4/1994 | Bayer . |
| 5,310,676 | 5/1994 | Johansson et al. . |
| 5,312,867 | 5/1994 | Mitsuno et al. . |
| 5,317,059 | 5/1994 | Chundury et al. . |
| 5,342,886 | 8/1994 | Glotin et al. . |
| 5,348,794 | 9/1994 | Takahashi et al. . |
| 5,356,676 | 10/1994 | von Widdern et al. . |
| 5,356,709 | 10/1994 | Woo et al. . |
| 5,371,141 | 12/1994 | Gelles et al. . |
| 5,378,543 | 1/1995 | Murata et al. . |
| 5,378,800 | 1/1995 | Mok et al. . |
| 5,387,645 | 2/1995 | Montag et al. . |
| 5,423,421 | 6/1995 | Inoue et al. . |
| 5,437,474 | 8/1995 | Ament . |
| 5,501,887 | 3/1996 | Tanaka et al. . |

FOREIGN PATENT DOCUMENTS

| | | |
|---|---|---|
| 4142271 | 6/1993 | Germany . |
| 1291171 | 11/1989 | Japan . |
| 1059554 | 2/1967 | United Kingdom . |
| 2094832 | 3/1982 | United Kingdom . |
| 2177974 | 2/1987 | United Kingdom . |
| 83/00158 | 1/1983 | WIPO . |
| 86/07010 | 4/1986 | WIPO . |
| 91/09719 | 7/1991 | WIPO . |
| 93/02859 | 2/1993 | WIPO . |
| 93/09718 | 5/1993 | WIPO . |
| 93/23093 | 11/1993 | WIPO . |

ENCAPSULATED SEAM FOR MULTILAYER MATERIALS

This is a continuation-in-part application of U.S. application Ser. No. 08/478,869, filed Jun. 7, 1995, abandoned which application is hereby incorporated herein by reference.

TECHNICAL FIELD

The present invention relates to a seal geometry for containers and, more specifically, seams used to seal a container and compartments of a container which may be constructed from multilayer film materials.

BACKGROUND OF THE INVENTION

Containers used for the shipping, storing, and delivery of liquids, such as medical or therapeutic fluids, are often fabricated from single-ply or multi-ply polymer based materials. The materials used to construct the container must be folded or two sheets must otherwise be placed in overlapping relationship and the overlapping sheets bonded at their outer periphery to define a chamber or pouch for containing liquids. Typically, the materials are joined along their inner surfaces using bonding techniques such as heat sealing, radio-frequency sealing, thermal transfer welding, adhesive sealing, solvent bonding, sonic sealing, and laser welding.

For most applications, the seal formed must be of sufficient strength to withstand the stresses generated by dropping, or agitating the liquid filled container. Problems have been encountered in forming sufficiently strong seals in multilayered materials where the components that constitute the material are, in some way, incompatible with one another. One problem that has been encountered is in forming strong seals in multilayered materials that have a large discrepancy in the moduli of elasticity of the material component parts.

For example, a cell culture container described in co-pending and commonly assigned U.S. patent application Ser. No. 08/330,717, is constructed of a multilayered material having an outer layer of a polymer blend of styrene-ethylene-butene-styrene ("SEBS") block copolymer (40%–85% by weight), ethylene vinyl acetate (0–40% by weight), and polypropylene (10%–40% by weight) and an inner layer of a polystyrene. Because of the difference in the moduli of elasticity of the components of the multilayered material, it was not possible to form strong seals by bonding the polystyrene layers to one another. Consequently, the resulting cell culture container was not capable of being centrifuged at useful speeds, and could not in many instances be dropped at heights above six feet without the seals failing.

U.S. Pat. No. 3,403,064 ("the '064 patent") discloses a method of forming a composite plastic container with an inner and outer seal. The walls of the container are laminates each including an inner layer of a polyhalohydrocarbon film and an outer layer of a polyvinyl resin. A pair of the laminates are placed in confronting relation between a pair of dies. This results in a layered structure of four layers between the dies at the commencement of the sealing process. By squeezing the dies and applying inductive sealing energy, such as ultrasonic or radio frequency energy, two seals are formed. An outer seal is formed between the outer layers (polyvinyl resin). The inner layers (polyhalohydrocarbon films) melt and are pushed inward, out of the area of the dies, to form an inner seal 16. The sealing process thus creates two seal areas having different numbers of layers. The outer seal area comprises two layers (two polyvinyl resin layers), and the inner seal area comprises four layers (two polyvinyl resin layers and two polyhalohydrocarbon film layers). The difference in layers is created by forcing the inner layers out of the first seal area during the sealing process. To accomplish this, however, the materials of the inner and outer layers of the '064 patent must have varying responsiveness to exposure to ultrasonic or radio frequencies to allow for relative movement of the layers. This prevents the use of conduction sealing energies.

Other difficulties have been encountered in sealing access ports in the container. In the medical field, as well as in other fields, it is customary to include access ports so that the contents of the container may be accessed from outside the container. The access ports typically have a cylindrical shaped tube of small diameter that extends from outside the container to inside the container to provide a fluid passageway into and out of the container. Sealing of an access port to the side walls of the container using conductive heat sealing techniques however, has led, in an unacceptable number of cases, to what is termed as channel leak. Channel leak is thought to result from an incomplete seal along the outer periphery of the port tube with the sidewalls of the container thereby resulting in a channel that allows fluid to flow from the container along the outer periphery of the port tube.

For some medical applications, such as reconstituting drugs, it is desirable to construct a container with multiple compartments, with each compartment divided along a frangible seal which will rupture when subjected to a certain fluid pressure. For example, medical containers may include more than one compartment, separately containing substances which may be mixed once the frangible seam which divides the compartments is broken. One such type of multiple-compartment container is disclosed in U.S. Pat. No. 5,176,634 ("the '634 patent"). The container of the '634 patent is seamed around the periphery of the two sidewall inner surfaces, and includes a similar seam at an intermediate portion of the container to define two inner compartments. The intermediate seam is frangible ("peelable"). The '634 patent discloses making the periphery seam stronger by using a sealing technique with higher temperature, pressure and time than used to create the peelable seam. However, such a method of making a periphery seam which is sufficiently stronger than an internal frangible seam, while providing a leak proof frangible seam, is difficult and inexact. Slight variations in the sealing parameters in the '634 sealing technique could result in a weak peripheral seam or leakage in the frangible seam. Further, the '634 sealing technique would be ineffective in sealing multilayered materials if the inner layers of the materials were not capable of forming a strong peripheral seal.

Because of the problems discussed above relative to forming a strong peripheral seam in certain multilayered materials there is a need for a creating a suitably strong peripheral seam in such materials. Also, there is a need for an economical and leakproof way of providing an access port or tube which passes from within to outside the container through the container periphery seam. Further, because of the problems discussed above relative to the use of a frangible seam within the container and a container peripheral seam, there is a need for creating a suitable frangible internal seam while providing a peripheral seam which is of much greater strength.

SUMMARY OF THE INVENTION

In accordance with the present invention, containers and methods of sealing containers are provided which solve the problems set forth above.

It is an object of the present invention to provide a container having a first and second sidewall, the first and second sidewall each having an inner and outer surface. A skirt connects outer surfaces of the first and second sidewall to define an inner chamber therebetween.

In a second container of the present invention, a first sidewall is of a material having a first layer and a second layer, the second layer overlapping a portion of the first layer to define an overlap area. A sealing flange extends from the first layer outward of the overlap area. The container also includes a second sidewall connected to the first sidewall along the sealing flange to define an inner chamber between the first and second sidewall.

A third container of the present invention comprises a first sidewall and second sidewall each having outer surfaces. The first sidewall is connected to a portion of the second sidewall along a seam to define a chamber having an opening at one end. A tail seam is provided for sealing the chamber opening. The tail seam has a skirt connecting the outer surface of the first sidewall to the outer surface of the second sidewall.

A fourth container of the present invention comprises a first and second sidewall connected together along a peripheral seam to define an inner chamber therebetween. A strip material located along at least a portion of the first sidewall and extending parallel to container ends is of a material different than that of the first and second sidewalls. The strip material frangibly attaches the first sidewall to the second sidewall to define separate compartments in the inner chamber.

A fifth container of the present invention comprises a first and second sidewall each having inner and outer sides. The second sidewall is connected to a portion of the first sidewall to define a pouch having an inner chamber therebetween and an open end. A skirt connects the outer side of the first sidewall to the outer side of the second sidewall to close the pouch end. An access port extends through the skirt from outward the chamber to inward of the inner chamber to define a fluid pathway.

Another container of the present invention comprises a first sidewall having a first layer and a second layer. The second layer overlaps a portion of the first layer to define an overlap area. A sealing flange extends from the first layer outward of the overlap area. A second sidewall is connected to the first sidewall along the sealing flange to define an inner chamber therebetween. The second sidewall and the sealing flange define a first layered structure having a first number of layers along the sealing flange. The overlap area and the second sidewall define a second layered structure having a second number of layers. The second number of layers is greater than the first number of layers. The container is sealed by positioning peripheral edges of the first and second sidewalls into registration so that the overlap area is substantially centrally disposed over the second sidewall and applying sealing energy to the first number of layers to define a peripheral seam.

Other advantages and aspects of the present invention will become apparent upon reading the following description of the drawings and detailed description of the invention.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

The present invention relates to containers and a method for sealing multilayered materials whose inner layers are incapable of forming strong seals using current sealing techniques. The method of sealing containers of the present invention may be used to form containers, to provide access ports in containers without channel leak, and to provide a multi-chambered container having a strong peripheral seam with a frangible seam separating the individual compartments. The containers fabricated using the sealing method may be used for a wide variety of applications including the medical and food product industries. The preferred embodiment of the present invention, as depicted in the drawings, relates to the use of the present invention in containers for medical fluids, such as IV bags (for intravenous administration of medical solutions) or other fluid administration bags, and cell-culture bags.

Figure 1:
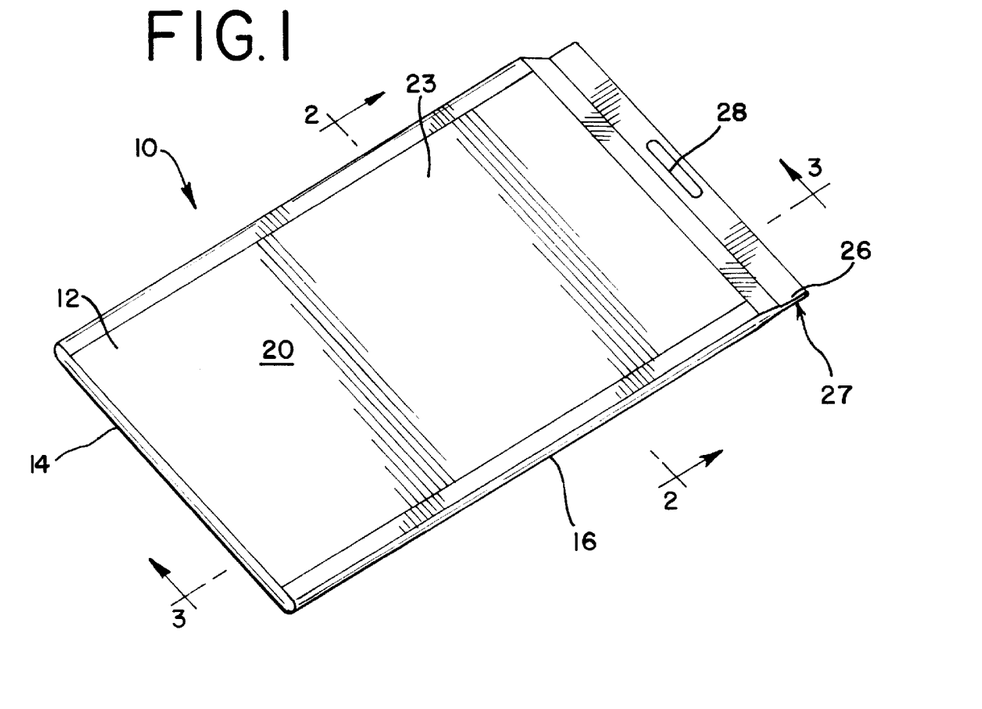
FIG. 1 is a perspective view of a medical fluid container of the present invention.
Figure 2:
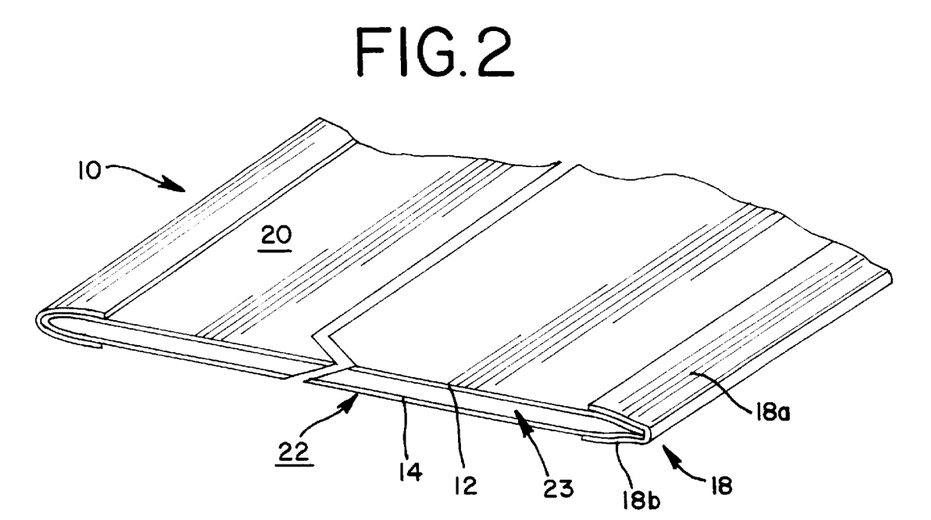
FIG. 2 is a cross-sectional view along line 2—2 of the container shown in FIG. 1.
Figure 3:
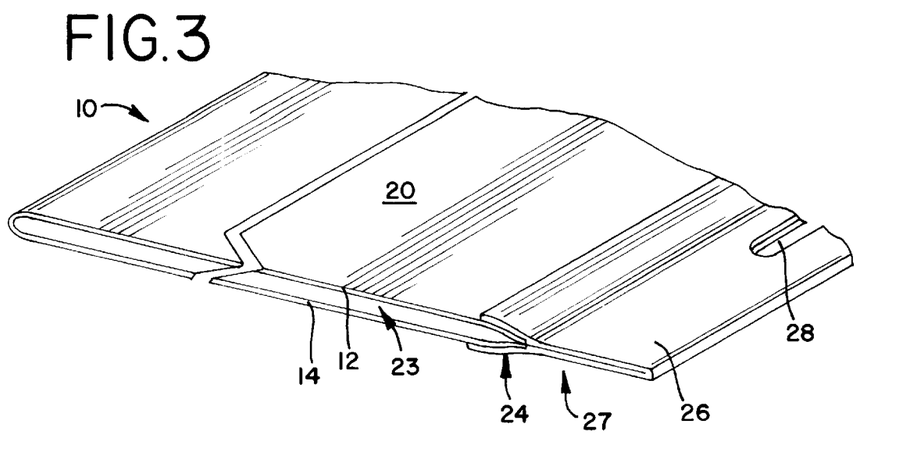
FIG. 3 is a cross-sectional view along line 3—3 of the container shown in FIG. 1.

As shown in FIGS. 1, 2, and 3, a container 10 has a first sidewall 12 attached to a second sidewall 14 along a peripheral seam 16. The peripheral seam 16 consist of a skirt 18 having a pair of connected legs 18a and 18b. The skirt 18 may be formed of a strip of material that is folded at an intermediate portion of the material wherein leg 18a attaches to a first sidewall outer surface 20 and leg 18b attaches to a second sidewall outer surface 22. A chamber 23 is defined between the first and second sidewalls 12 and 14 for the storage of fluids or other material.

The skirt 18 and the respective outer surfaces 20 and 22 of the first and second sidewalls 12 and 14 should be constructed of materials that allow for a strong bond to form using conductive, inductive, or other common sealing techniques. These materials are preferably selected from the group consisting of polyolefins including but not limited to polypropylene, polyethylene including low density polyethylene, polybutene and copolymers of the same; polyamides such as nylons, polyvinyl chloride, polyurethane, and polymer blends such as those disclosed in the commonly assigned U.S. Pat. No. 4,140,162, which is incorporated herein by reference. Such polymer blends include a blend of styrene-ethylene-butene-styrene ("SEBS") block copolymer (40%–85% by weight), ethylene vinyl acetate (0%–40% by weight), and polypropylene (10%–40% by weight).

As shown in FIG. 3, at one end 24 of the container the skirt 18 includes a flange 26 to seal end 24 of the container. This skirt 18 may sometimes be referred to as a tail seal 27. The tail seal 27 may be used to close an open pouch that has been previously sealed by the present sealing technique or by other methods. The flange 26 has a portion removed at an intermediate portion of the flange 26 to define a hanger hole 28 dimensioned to receive a bag hanger apparatus for suspending the container 10.

Figure 4:
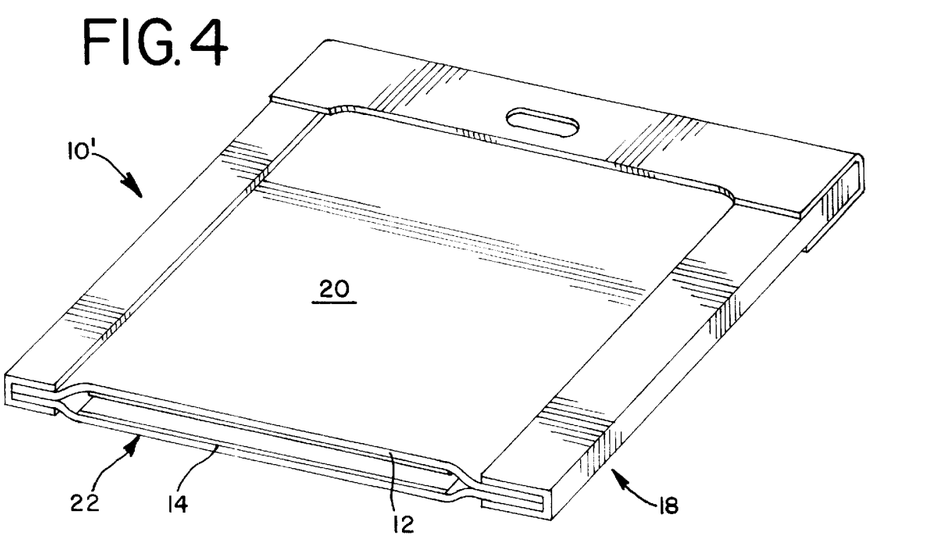
FIG. 4 is a cross-sectional view of a container having one side wall of a multilayered material.
Figure 5:
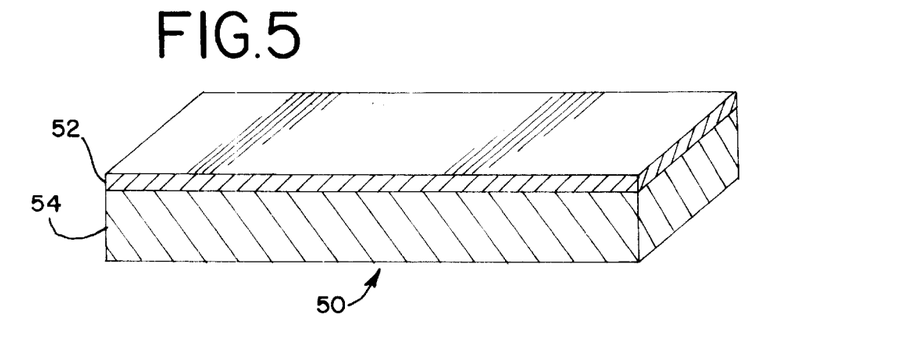
FIG. 5 is a cross-sectional view of a multilayered material used to construct a sidewall.

FIG. 4 shows container 10' having sidewall 14 constructed from a multilayered material 50 (FIG. 5). The multilayered material has at least inner 52 and outer 54 layers, but of course could include additional layers without departing from the invention. Because skirt 18 attaches the outer surfaces 20 and 22 respectively of the first and second sidewalls 12 and 14, it does not matter whether inner layer 52 is capable of forming a strong bond with sidewall 12. The outer layer 52 is preferably of a material selected from the same group set forth above for the side walls. The inner layer 54 may be selected from the group of polystyrene, and ethylene vinyl alcohol or other material that provides a desired functionality to the container 10'.

Figures 6, 7:
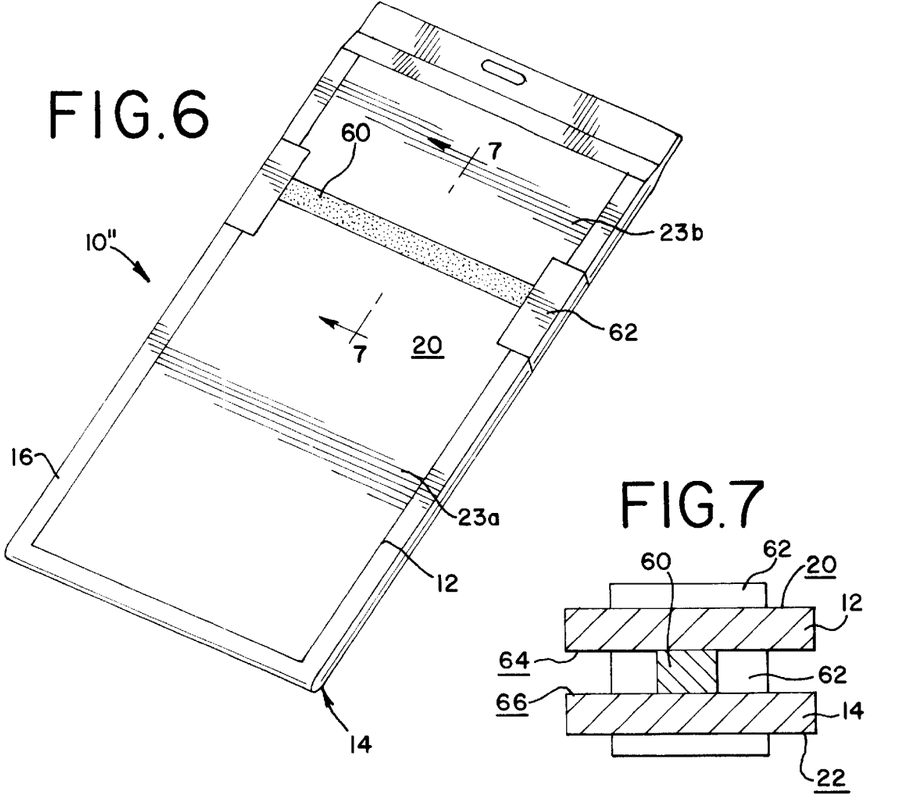
FIG. 6 is a perspective view of a multichambered container having subchambers divided along a frangible seam.
FIG. 7 is a cross-sectional view taken along line 7—7 of FIG. 6.

FIGS. 6 and 7 show such a container 10" having a frangible seam 60 which extends laterally across the container 10" and connects the first sidewall 12 to the second sidewall 14 along the frangible seam 60. The frangible seam 60 thereby divides the inner chamber 23 into subchambers 23a and 23b. It would also be possible to provide a longitudinal frangible seam without departing from the invention. The first and second side walls 12 and 14 may be sealed together as shown in FIG. 1 with a skirt 18 forming a peripheral seam 16 around the entire periphery of the container 10" or by sealing the inner surfaces 64 and 66 of the respective first and second sidewalls 12 and 14 together along the periphery of the container 10". A strong peripheral seam 16 may be formed along the inner surfaces 64 and 66 of the first and second sidewalls 12 and 14 if the inner surfaces of the first and second sidewalls 12 and 14 are of a material specified above which are capable of forming a strong seal.

The frangible seam 60 is preferably selected from a material that has a higher modulus of elasticity and therefore more stiff than the material used to construct the first and second sidewalls 12 and 14. An example of such a material to form the frangible seam 60 would be polystyrene when used with the polymer blend of SEBS, EVA, and polypropylene. Ethylene vinyl alcohol would be another example when used with ethylene vinyl acetate.

If the frangible seam 60 extends laterally to the outer periphery of the container forming a weak seal at the outer periphery, then it is necessary to include a short skirt 62 to attach the outer surface 20 of the first side wall 12 to the outer surface 22 of the second side wall to shore up this weak seam area. The short skirt 62 may be fabricated from the same category of materials as the sidewalls and the skirt 18 set forth above.

The container 10" has particular uses in the medical field for providing a multi-chamber container so that the subcompartments may contain chemicals or solutions which may be mixed together in the container 10" immediately before use. For example, a multi-chamber medical fluid administration bag 10" may contain different substances in the different compartments, and the frangible seam 60 may be broken by medical personnel by applying pressure to the frangible seam 60 (such as by squeezing one 23a or both 23a and 23b of the compartments). Once the substances are properly mixed, the mixed solution may be administered to the patient. Another example of a use for a multi-chambered container having such a frangible seam 60 is in containers used as hot or cold packs. Such containers utilize chemicals which, when mixed, undergo an exothermic, or an endothermic, chemical reaction. The container 10" according to the present invention provides a container with compartments 23a and 23b separated by a frangible seam 60 which may be broken when the hot pack or cold pack is needed, without the concern for inadvertently rupturing the peripheral seam of the container.

Figure 8:
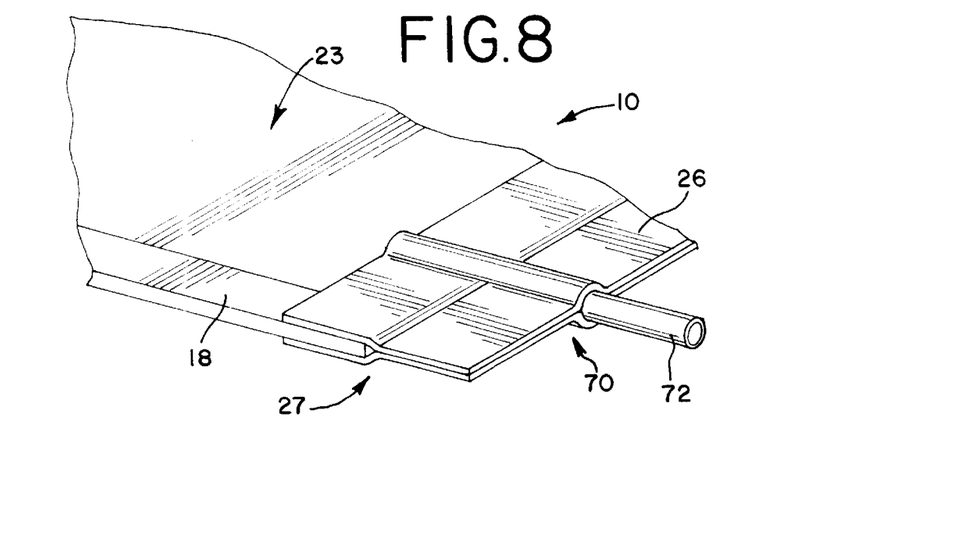
FIG. 8 is a break away view of a container having an access port.
Figure 11:
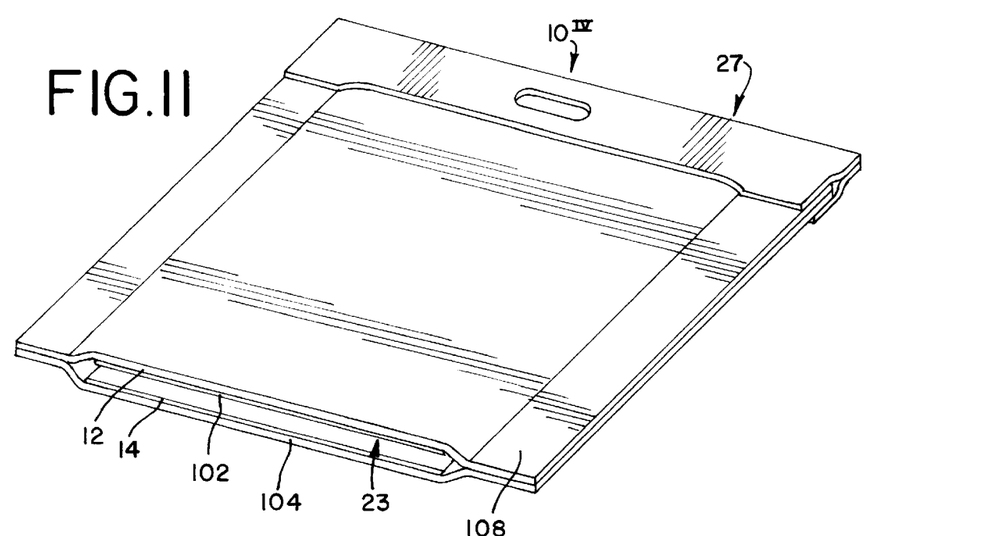
FIG. 11 is a perspective view of a container constructed of a multilayered material with the first and second side walls connected along a sealing flange on interim surfaces of the first and second sidewalls and including a tail seam closing a portion of the container.

FIG. 8 shows an access port 70 in one end of a container 10. The access port 70 may be provided in any of the containers described above to allow access to the contents of the inner chamber 23 from outside the container. It may be desirable to include more than one access port 70 or a plurality of access ports 70 at various locations on the container including at opposite ends of the container 10 as shown in FIG. 11. The access port 70 of FIG. 8 has a port tube 72 which extends from outside the container to the inner chamber 23 of the container 10. Typically, the port tube 72 is sealed by a membrane (not shown) that prevents contamination of the contained solution from the environment. As shown in FIG. 8, the port tube may be incorporated into the tail seal 27 so that the access port 70 will be incorporated into the container 10 upon sealing of the open end of the container with the tail seal 27.

Figure 9:
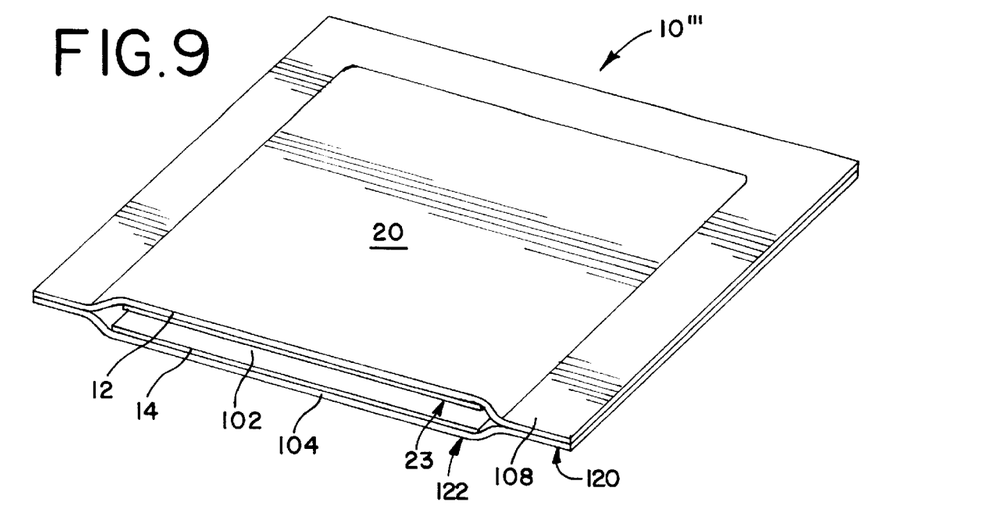
FIG. 9 is a perspective view of a container constructed from a multilayered material with the first and second sidewalls connected along interior surfaces along a sealing flange.

FIG. 9 shows a container 10''' fabricated from a multilayered material 100 (FIG. 10) having inner and outer layers 102 and 104. The outer layer 104 comprises a first layer and the inner layer 102 comprises a second layer. The inner layer 102 overlaps a portion of the outer layer 104 to define an overlap area 106. A sealing flange 108 extends from the outer layer 104 outside the overlap area 106. Fold lines 110 separates the material 100 into two panels that when folded will form the sidewalls 12 and 14. The container 10''' is fabricated by folding the material 100 along fold lines 110 to bring the sidewalls 12 and 14 into registration and sealing the material 100 along the sealing flange 108 to seal the container 10'''. FIG. 11 shows container $10^{IV}$ which is the same in all respects to container 10''' of FIG. 9 except one end of the container is sealed by a tail seam 27.

As further shown in FIGS. 9, 10 and 13–18, before any sealing process is commenced, peripheral edges of the first and second sidewalls 12,14 are brought into registration. As a result, the overlap area 106 (FIG. 10) of the first sidewall 12 is substantially centrally disposed over the overlap area 106 of the second sidewall 14 wherein the inner layers 102 of each multilayered material 100 are in confronting relation. The sealing flanges 108 of the first sidewall 12 and the second sidewall 14 are in also confronting relation. In this configuration, the sealing flange 108 of the first sidewall 12 and the sealing flange 108 of the second sidewall 14 define a first layered structure 120 having a first number of layers along the sealing flange 108, i.e., two layers. The overlap area 106 of the first sidewall 12 and the overlap area 106 of the second sidewall 14 define a second layered structure 122 having a second number of layers, i.e., four layers. The second layered structure 122 has a greater number of layers than the first layered structure 120.

Figure 13:
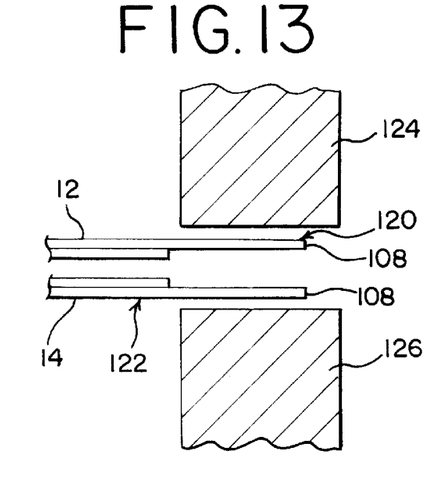
FIG. 13 is a partial elevational view of a pair of multilayered sidewalls between a pair of open dies.
Figure 14:
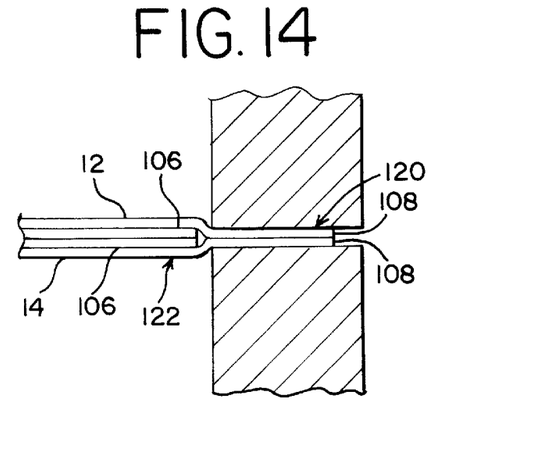
FIG. 14 is a partial elevational view of the multilayered sidewalls shown in FIG. 13 but with the dies closed.
Figure 16:
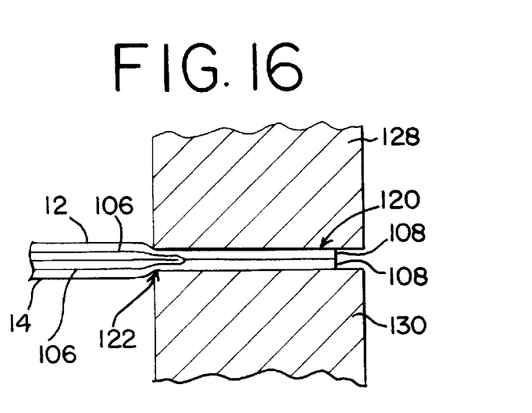
FIG. 16 is a partial elevational view of a pair of multilayered sidewalls between another pair of closed dies.

As further shown in FIG. 13, the registered sidewalls 12,14 are placed between a pair of sealing dies 124,126. FIG. 13 shows the sealing dies 124,126 open. Specifically, the sealing flanges 108 that define the first layered structure 120 are positioned between the dies 124,126. As shown in FIG. 14, the sealing dies 124,126 are closed against the first layered structure 120. Sealing energy is then applied to the first layered structure 120 through the dies 124,126 to form a peripheral seam. The sealing energy can be applied through conduction sealing techniques or induction sealing techniques such as ultrasonic and radio frequency energy. FIG. 16 shows the first layered structure 120 and a portion of the second layered structure 122 between another pair of sealing dies 128,130 to form a peripheral seam. Thus, it is understood that, if desired, the sealing energy can be applied not only to the sealing flanges 108, or first layered structure 120, but also to the overlap areas 106, or second layered structure 122. It is further understood that the first layered structure 120 and the second layered structure 122 could include greater numbers of layers without departing from the scope of the present invention.

Figure 15:
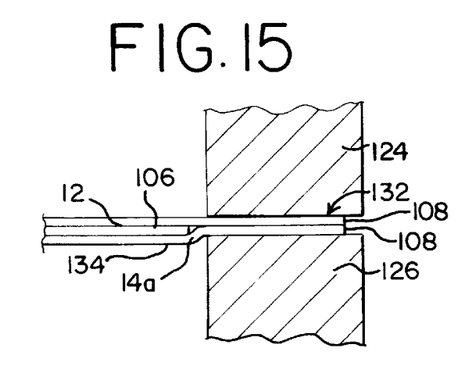
FIG. 15 is partial elevational view of a pair of sidewalls between a pair of closed dies wherein only one of the sidewalls is multilayered.

While the sidewalls 12,14 are typically made from multilayered materials 100, as shown in FIG. 15, one of the sidewalls may be a single layer. In this configuration, peripheral edges of the first sidewall 12 are brought into registration with a single-layered sidewall 14a having a sealing flange 108. As a result, the overlap area 106 of the first sidewall 12 is substantially centrally disposed over the second sidewall 14a. The sealing flange 108 of the first sidewall 12 is in registration with the sealing flange 108 of the second sidewall 14a. In this configuration, the sealing flange 108 of the first sidewall 12 and the sealing flange 108 of the second sidewall 14a define a first layered structure 132 having a first number of layers along the sealing flange 108, i.e., two layers. The overlap area 106 of the first sidewall 12 and the second sidewall 14a define a second layered structure 134 having a second number of layers, i.e., three layers. The second layered structure 134 has a greater number of layers than the first layered structure 132. As further shown in FIG. 15, sealing energy is applied to the first layered structure 132 to form a peripheral seam.

Figure 17:
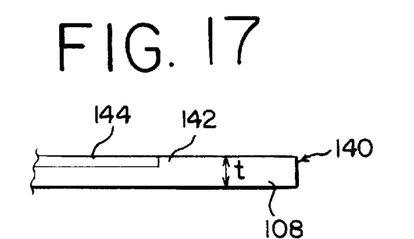
FIG. 17 is a partial elevational view of a multilayered sidewall having a uniform thickness; and, FIG. 18 is a partial elevational view of a pair of multilayered sidewalls shown in FIG. 17 between a pair of closed dies.
Figure 18:
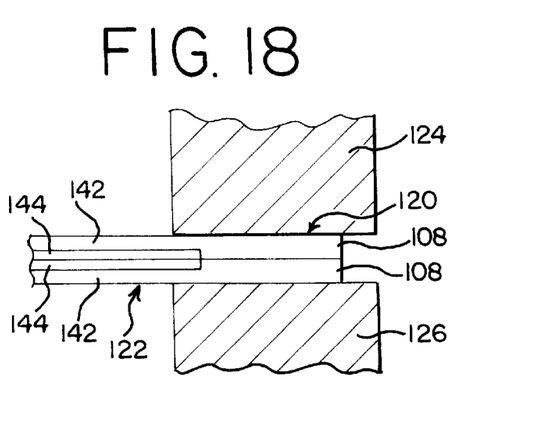

FIGS. 17 and 18 show another multilayered material 140 of the present invention to form the first and second sidewalls 12,14. The multilayered material 140 has a first layer 142 and a second layer 144. Although the material 140 has multiple layers, it has a uniform thickness "t" across a width of the web of material. A portion of the first layer 142 that extends outwardly from the second layer 144 comprises the sealing flange 108. As shown in FIG. 18, the sidewalls 12,14 comprising the multilayered material 140 are placed between the pair of sealing dies 124,126 wherein the sealing flanges 108 are in registration. This results in the first layered structure 120 and the second layered structure 122. Sealing energy is applied to the first layered structure 120 along the sealing flanges 108 to form a peripheral seam. If desired, sealing energy can also be applied to the second layered structure 122.

Thus, a container is formed having different layered structures. Unlike the '064 patent previously discussed, the container of the present invention is formed wherein, from the start of the process, a first layered structure and a second layered structure are present wherein the second layered structure has a greater number of layers than the first layered structure. These layered structures are formed from the initial positioning of the sidewall materials. The layered structures are not created from the sealing process itself as in the '064 patent. The present invention allows for greater versatility in the available sealing energies that can be used such as both conductive and inductive sealing techniques. The invention is not dependent on certain properties of the sidewall materials such as inner layer responsiveness to radio frequency energy.

It is understood that the skirt 18 previously described could also be used to connect the outer surfaces of the first and second sidewalls 12,14.

Figure 10:
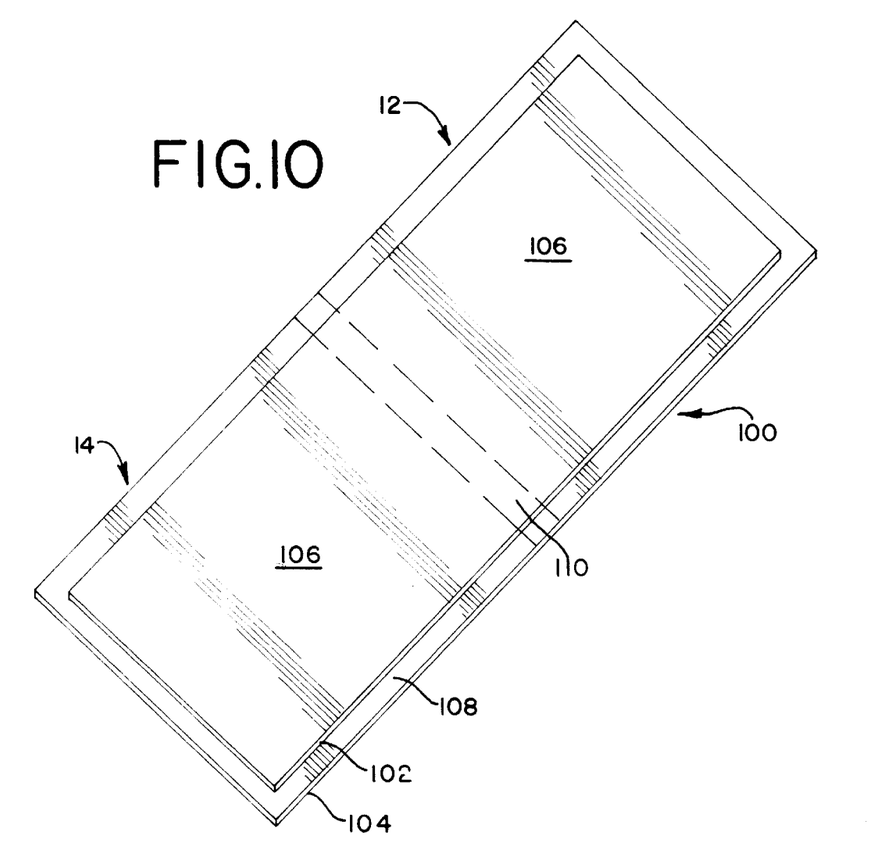
FIG. 10 is a plan view of a blank used to fabricate the container shown in FIG. 9.

The outer layer 104 of the material 100 may be selected from the category of materials set forth above for the sidewalls, and the inner layer 102 may be of the same category of material used to form the frangible seam 60. The inner layer 102 may be coextruded onto the outer layer 104 or deposited thereon using printing techniques such as roller, brush, spray, Gravure printing, screen printing, hot stamping, ink-jet printing, chemical vapor deposition, or electrostatic deposition.

Figure 12:
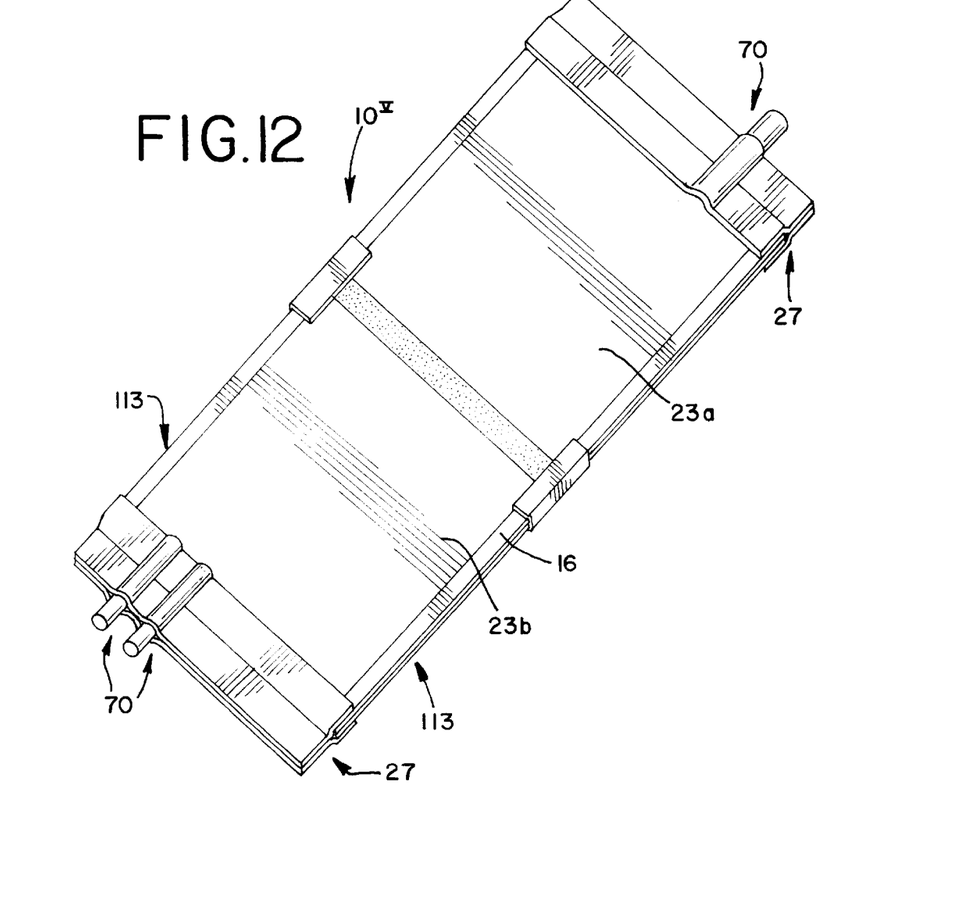
FIG. 12 is a perspective view of a multichambered container having multiple access ports for accessing the subchambers independently from one another.

FIG. 12 shows a multichambered container $10^V$ having tail seams 27 sealing opposite ends of the container and providing multiple access ports 70 which will allow access to chamber 23a and 23b independently of one another. Container$^V$ is shown with its peripheral seal 16 connecting the inner walls 64 and 66 (FIG. 7) respectively of sidewalls 12 and 14 (as also described with reference to FIGS. 9 and 10) to define a tube and closing the open ends of the tube with two tail seams 27. Container$^V$ could also be sealed with a skirt 18 (FIG. 2) connecting outer surfaces 20 and 22 along lateral edges 113 of the container to define a tube and closing off both ends of the tube with tail seams 27.

The containers of the present invention may be fabricated by positioning the first and second sidewalls 12 and 14 so that the outer peripheries of the respective sidewalls are in registration. This may be accomplished by folding a single sheet of material along a fold line, as shown in FIG. 10, or by using two separate sheets of material. The first leg of the skirt 18a is then attached to the first sidewall outer surface 20 along the entire outer periphery followed by attaching the second leg of the skirt 18b to the outer surface 22 of the second side wall along its entire outer periphery to define an inner chamber 22 between the first and second sidewalls 12 and 14.

It is also possible to use this method of sealing a container on only a portion of a container. For example, tail seam 27 may be used to seal an open end of a pouch or two tail seams may be used to seal two open ends of a tube. The pouch is formed by sealing three sides of the first and second side walls 12 and 14 by attaching the first and second sidewall outer surfaces 20 and 22 using a skirt 18 or by attaching their inner surfaces 64 and 66 together. Likewise, a tube may be formed by attaching opposite lateral edges 113 of the sidewalls 12 and 14. Such a pouch or tube may be sealed using the tail seal 27 or tail seals to connect the outer surfaces 20 and 22 of the first and second side walls 12 and 14 proximate the open end or end of the pouch or tube.

The side walls 12 and 14 may be sealed by any conventional means such as using heated die and platen which may be followed by a chill die and platen as is well known in the industry.

While the specific embodiments have been illustrated and described, numerous modifications come to mind without significantly departing from the spirit of the invention and the scope of protection is only limited by the scope of the accompanying Claims.

We claim:

1. A container comprising:
   a first sidewall having a first layer and a second layer formed by coextrusion, the second layer overlapping a portion of the first layer to define an overlap area;
   a sealing flange extending from the first layer outward of the overlap area;
   a second sidewall being connected to the first sidewall along the sealing flange to define an inner chamber therebetween;
   the second sidewall and the sealing flange defining a first layered structure having a first number of layers along the sealing flange;
   the overlap area and the second sidewall defining a second layered structure having a second number of layers, the second number of layers being greater than the first number of layers; and,
   wherein the container is sealed by positioning peripheral edges of the first and second sidewalls into registration so that the overlap area is substantially centrally disposed over the second sidewall and applying sealing energy to the first number of layers to define a peripheral seam.

2. The container of claim 1 further comprising:
   a frangible seam at an intermediate portion of the first and second sidewalls to divide the inner chamber into two compartments.

3. The container according to claim 1, wherein said first layer is selected from the group consisting of polyolefins, polyamides, polyvinyl chloride, polyurethane, and polymer blends.

4. The container according to claim 1, wherein said second layer is selected from the group consisting of polystyrene, and ethylene vinyl alcohol.

5. The container according to claim 2, wherein the frangible seam is capable of being broken by mechanical stress while the peripheral seam is not broken.

6. The container according to claim 1, further comprising:
   an access port extending through the peripheral seam from outside the chamber to inside the chamber to define a fluid pathway.

7. The container according to claim 1, further comprising:
   a skirt connecting an outer side of the first sidewall to an outer side of the second sidewall to encapsulate the peripheral seam.

8. The container according to claim 7, further comprising:
   an access port extending through the skirt and peripheral seam from outside the chamber to inside the chamber to define a fluid pathway.

9. The container according to claim 8, wherein the access port has an outer surface sealed to the skirt to form a leakproof attachment of the access port to the container.

10. The container according to claim 1, wherein the multilayered first sidewall has a uniform thickness.

11. A container comprising:
    a first sidewall having an outer surface and an inner surface, the first sidewall having a first layer and a second layer, the second layer overlapping a central portion of the first layer to define an overlap area;
    a sealing flange extending from the first layer outward of the overlap area;
    a second sidewall having an outer surface and an inner surface, the second sidewall being connected to the first sidewall along the sealing flange to define an inner chamber therebetween;
    the second sidewall and the sealing flange defining a first layered structure having a first number of layers along the sealing flange;
    the overlap area and the second sidewall defining a second layered structure having a second number of layers, the second number of layers being greater than the first number of layers;
    a polyolefin skirt connecting the outer surface of the first sidewall to the outer surface of the second sidewall along the sealing flange; and,
    wherein the container is sealed by positioning peripheral edges of the first and second sidewalls into registration so that the overlap area is substantially centrally disposed over the second sidewall and applying sealing energy to the skirt and first number of layers.

12. A container comprising:
    a first sidewall having a first layer and a second layer formed by coextrusion, the second layer overlapping a portion of the first layer to define an overlap area;
    a first sealing flange extending from the first layer of the first sidewall outward of the overlap area;
    a second sidewall having a first layer and a second layer, the second layer overlapping a portion of the first layer to define an overlap area;
    a second sealing flange extending from the first layer of the second sidewall outward of the overlap area;
    the second sidewall being connected to the first sidewall along the sealing flanges to define an inner chamber therebetween;
    the sealing flanges defining a first layered structure having a first number of layers;
    the overlap areas defining a second layered structure having a second number of layers, the second number of layers being greater than the first number of layers;
    wherein the container is sealed by positioning the sealing flanges of the first and second sidewalls into registration so that the overlap areas are substantially centrally disposed over one another and applying sealing energy to the first number of layers to define a peripheral seam; and
    a skirt connecting an outer side of the first sidewall to an outer side of the second sidewall to encapsulate the peripheral seam.

13. The container according to claim 12, further comprising:
    an access port extending through the peripheral seam from outside the chamber to inside the chamber to define a fluid pathway.

14. The container according to claim 12, further comprising:
    an access port extending through the skirt and peripheral seam from outside the chamber to inside the chamber to define a fluid pathway.

15. The container according to claim 14, wherein the access port has an outer surface sealed to the skirt to form a leakproof attachment of the access port to the container.

16. A container comprising:
a first sidewall having a first layer and a second layer, the second layer overlapping a central portion of the first layer to define an overlap area;
a sealing flange extending from the first layer outward of the overlap area, the sealing flange having opposed lateral edges;
a second sidewall being connected to the first sidewall along the sealing flange to define an inner chamber therebetween;
the second sidewall and the sealing flange defining a first layered structure having a first number of layers along the sealing flange;
the overlap area and the second sidewall defining a second layered structure having a second number of layers, the second number of layers being greater than the first number of layers;
wherein the container is sealed by positioning peripheral edges of the first and second sidewalls into registration so that the overlap area is substantially centrally disposed over the second sidewall and applying sealing energy to the first number of layers to define a peripheral seam; and,
a strip material having a width and extending between lateral edges of the sidewalls to define a frangible seam, the strip material being of a material different than that of the first and second sidewalls and frangibly attaching the first sidewall to the second sidewall along the frangible seam to define separate compartments in the inner chamber.

17. The container according to claim 16 wherein the first and second sidewalls are constructed of a multilayer material including an inner layer of polystyrene material and an outer layer of polyolefin material.

18. The container of claim 16 further comprising two short skirts fixedly attaching the first sidewall to the second side wall, one of each short skirts located at opposite lateral edges and overlapping the strip material, the short skirts extending along a portion of the lateral edges.

19. A container comprising:
a first sidewall having an outer side and an inner side, the first sidewall having a first layer and a second layer, the second layer overlapping a central portion of the first layer to define an overlap area;
a sealing flange extending from the first layer outward of the overlap area;
a second sidewall having outer and inner sides, the second sidewall being connected to a portion of the first sidewall sealing flange to define a pouch having an inner chamber therebetween and an open end;
the second sidewall and the sealing flange defining a first layered structure having a first number of layers along the sealing flange;
the overlap area and the second sidewall defining a second layered structure having a second number of layers, the second number of layers being greater than the first number of layers;
wherein the container is sealed by positioning peripheral edges of the first and second sidewalls into registration so that the overlap area is substantially centrally disposed over the second sidewall and applying sealing energy to the first number of layers;

a skirt connecting the outer side of the first side wall to the outer side of the second sidewall to close the pouch end; and
an access port extending through the skirt from outward the chamber to inward of the inner chamber to define a fluid pathway.

20. A method of fabricating a container comprising the steps of:
providing a first sidewall having a first layer and a second layer formed by coextrusion, the second layer overlapping a central portion of the first layer to define an overlap area;
providing a sealing flange extending from the first layer outward of the overlap area;
providing a second sidewall having an outer periphery;
positioning the sealing flange of the first side wall in registration with the outer periphery of the second side wall, wherein the sealing flange and second sidewall define a first layered structure having a first number of layers along the sealing flange, and the overlap area and the second sidewall define a second layered structure having a second number of layers, the second number of layers being greater than the first number of layers; and
applying sealing energy to the first number of layers to define a sealed chamber between the first and second sidewalls.

21. A container comprising:
a first sidewall having a first layer and a second layer, the second layer overlapping a portion of the first layer to define a first overlap area;
a first sealing flange extending from the first layer of the first sidewall outward of the overlap area;
a second sidewall having a first layer and a second layer, the second layer overlapping a portion of the first layer to define a second overlap area;
a second sealing flange extending from the first layer of the second sidewall outward of the overlap area;
the second sidewall being connected to the first sidewall along the first sealing flange and the second sealing flange to define an inner chamber therebetween;
the first sealing flange and the second sealing flange defining a first layered structure having a first number of layers;
the overlap areas defining a second layered structure having a second number of layers, the second number of layers being greater than the first number of layers;
wherein the container is sealed by positioning the sealing flanges of the first and second sidewalls into registration so that the overlap areas are substantially centrally disposed over one another and applying sealing energy to the first number of layers to define a peripheral seam;
a skirt connecting an outer side of the first sidewall to an outer side of the second sidewall to encapsulate the peripheral seam; and
an access port extending through the skirt and peripheral seam from outside the chamber to inside the chamber to define a fluid pathway.

22. A container comprising:
a first sidewall having a first layer and a second layer, the second layer overlapping a portion of the first layer to define an overlap area, the first sidewall having a substantially uniform thickness across a width of the sidewall;

a sealing flange extending from the first layer outward of the overlap area;

a second sidewall being connected to the first sidewall along the sealing flange to define an inner chamber therebetween;

the second sidewall and the sealing flange defining a first layered structure having a first number of layers along the sealing flange;

the overlap area and the second sidewall defining a second layered structure having a second number of layers, the second number of layers being greater than the first number of layers; and wherein the container is sealed by positioning peripheral edges of the first and second sidewalls into registration so that the overlap area is substantially centrally disposed over the second sidewall and applying sealing energy to the first number of layers to define a peripheral seam.

* * * * *